(12) United States Patent
Kadav

(10) Patent No.: US 10,679,145 B2
(45) Date of Patent: Jun. 9, 2020

(54) SYSTEM AND METHOD FOR BALANCING COMPUTATION WITH COMMUNICATION IN PARALLEL LEARNING

(71) Applicant: NEC Laboratories America, Inc., Princeton, NJ (US)

(72) Inventor: Asim Kadav, Plainsboro, NJ (US)

(73) Assignee: NEC Corporation (JP)

( * ) Notice: Subject to any disclaimer, the term of this patent is extended or adjusted under 35 U.S.C. 154(b) by 1002 days.

(21) Appl. No.: 15/208,526

(22) Filed: Jul. 12, 2016

(65) Prior Publication Data

US 2017/0039485 A1 Feb. 9, 2017

Related U.S. Application Data

(60) Provisional application No. 62/202,224, filed on Aug. 7, 2015.

(51) Int. Cl.
*G06N 20/00* (2019.01)
*G06F 9/50* (2006.01)

(52) U.S. Cl.
CPC .......... *G06N 20/00* (2019.01); *G06F 9/5083* (2013.01)

(58) Field of Classification Search
CPC .......... G06F 9/46; G06F 9/5083; G06N 20/00
See application file for complete search history.

(56) References Cited

U.S. PATENT DOCUMENTS

| 5,781,700 A * | 7/1998 | Puskorius | F02D 41/1405 |
| | | | 706/14 |
| 2014/0142929 A1* | 5/2014 | Seide | G06N 3/08 |
| | | | 704/202 |

OTHER PUBLICATIONS

Wang et al., "Minerva: A Scalable and Highly Efficient Training Platform for Deep Learning", 2014, APSys, pp. 1-9 (Year: 2014).*
Li et al., "Scaling Distributed Machine Learning with the Parameter Server", Oct. 16-18, 2014, 11th USENIX Symposium on Operating Systems Design and Implementation (OSDI '14), pp. 583-598 (Year: 2014).*
Cui, Henggang et al., "Exploiting bounded staleness to speed up big data analytics" USENIX ATC (, 2014).
Mu Li et al., "Scaling Distributed Machine Learning with the Parameter Server" OSDI (, 2014).
Jeff Dean et al., "Large Scale Distributed Deep Networks" NIPS (, 2012).

* cited by examiner

*Primary Examiner* — Alan Chen
*Assistant Examiner* — Brent Johnston Hoover
(74) *Attorney, Agent, or Firm* — Joseph Kolodka

(57) ABSTRACT

A machine learning method includes installing a plurality of model replicas for training on a plurality of computer learning nodes; receiving training data at a each model replica and updating parameters for the model replica after trailing; sending the parameters to other model replicas with a communication batch size; evaluating received parameters from other model replicas; and dynamically adjusting the communication batch size to balance computation and communication overhead and ensuring convergence even with a mismatch in processing abilities on different computer learning nodes.

18 Claims, 4 Drawing Sheets

STATE OF THE ART: BOUNDED STALENESS

*1. Compute new model parameters w.*

*2. Send model computed after <N> iterations to all other replicas.*

*3. Read the received replicas.*

*4. Merge the received models; if iter_count too far ahead of others, slow down or halt temporarily.*

PARALLEL MODEL TRAINING

SYSTEM AND METHOD FOR BALANCING COMPUTATION WITH COMMUNICATION IN PARALLEL LEARNING

This application claims priority to Provisional Application 62202224, the content of which is incorporated by reference.

BACKGROUND

The present invention relates to parallel learning.

Distributed systems aim to make many machines work harmoniously together as though they were one. With an increase in the volume of data being collected today, the need to efficiently distribute computation has greatly increased. Today, distributed computation is ubiquitous. For some problems, there are many existing implementations of distributed systems that can scale out computation efficiently, but there are many other problems where significant roadblocks prevent efficient distribution.

There are many platforms that implement distributed machine learning. One approach is shown in FIG. 1, where all models train asynchronously without any guarantees (Mini Batching). In asynchronous mini-batching, parallel models train asynchronously and exchange updates after processing a fixed number of iterations (fixed communication batch size). As different models process at different speeds, the models may diverge from one-another. Furthermore, if the developers chooses a naïve value of batch size, the computation may be imbalanced in terms of CPU and network. Another platform is called Bounded-Staleness learning shown in FIG. 2. The bounded staleness approach towards mini-batching trains asynchronously. Additionally, each node sends its iteration count apart from the updates. If a node notices it is too far ahead of another node, it slows down waiting for the slower node to catch up. In this approach, like mini-batching the communication batch size is fixed.

SUMMARY

In one aspect, a machine learning method includes installing a plurality of model replicas for training on a plurality of computer learning nodes; receiving training data at a each model replica and updating parameters for the model replica after trailing; sending the parameters to other model replicas with a communication batch size; evaluating received parameters from other model replicas; and dynamically adjusting the communication batch size to balance computation and communication overhead and ensuring convergence even with a mismatch in processing abilities on different computer learning nodes.

In another aspect, a machine learning method includes installing a plurality of model replicas for training on a plurality of computation nodes; receiving training data at a each model replica and updating parameters for the model replica after training; sending the parameters to all other model replicas with a starting communication batch size; evaluating received parameters from other model replicas; and adjusting the communication batch size during training to balance computation and communication overhead and ensuring convergence even with a mismatch in processing abilities on different computation nodes.

In another aspect, training data is received by a model replica, which computes the new model parameters W. The new model is sent after a predetermined N iterations to all other replicas. The system then reads and counts the number of receiving replicas. Next, the system merges the received models and increases a communication batch size (cb_size) if the number of received models are below a predetermined threshold, and decreases the cb_size if the number of received models exceed another threshold called iteration counts. cb_size represents a communication batch size with the number of samples trained before the updated model is sent out iter_count represents the iteration count (of data) being processed at each node.

Implementations of the above aspects may include one or more of the following. The method includes sending iteration counts and counting the model updates that arrive at each model replica, and if a model replica notices too few replicas, the model replica increases the communication batch size in increments, and if the model replica notices other model replicas have higher iteration counts as compared to its iteration count, the model replica increases model update transmission frequency as other computation nodes merge their updates. The method achieves balancing computation and communication in distributed machine learning. The communication batch sizes can be adjusted to automatically balance processor and network loads. The method includes ensuring accurate convergence and high accuracy machine learning models by adjusting training sizes with communication batch sizes. A plurality of model replicas can train in parallel using parameter updates. The model replicas can train and compute new model weights. The method includes sending or receiving parameters from all other model replicas and applying the parameters to the current model replica model.

Advantages of the preferred embodiments may include one or more of the following. Balancing CPU and network provides an efficient system that trains machine-learning models quickly and with low running costs. Ensuring all replicas converge at the same time, improves model accuracy. More accurate models, with faster training times ensures that all NEC businesses and applications such as job recommendations, internet helpdesks, etc. provide more accurate results.

DESCRIPTION

Figure 1:
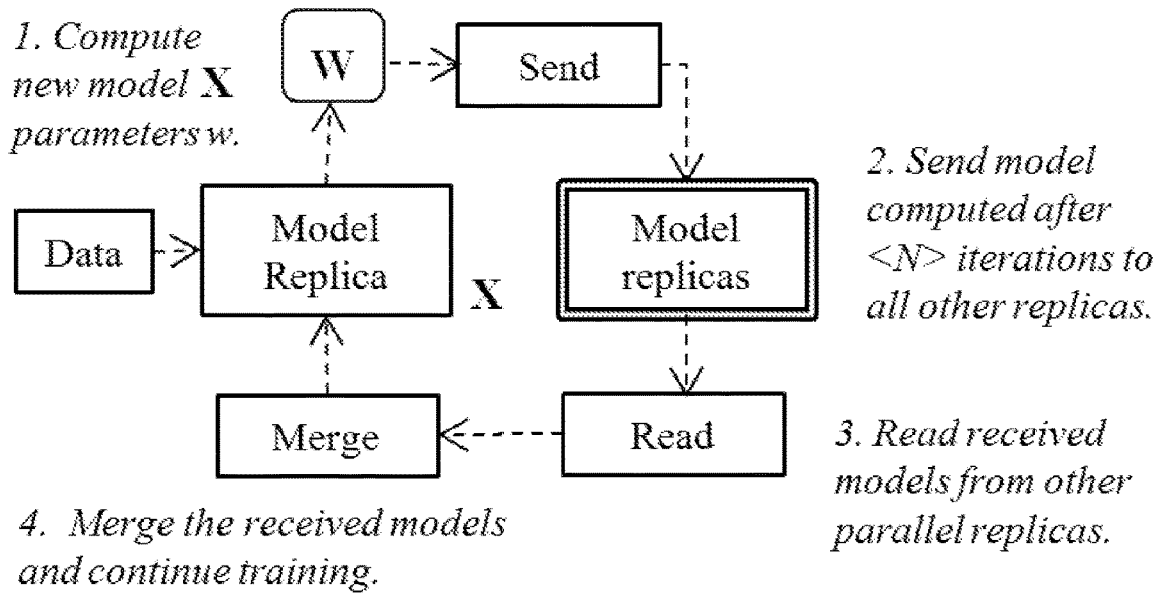
FIG. 1 shows a conventional system, where all models train asynchronously without any guarantees (Mini Batching).
Figure 1:
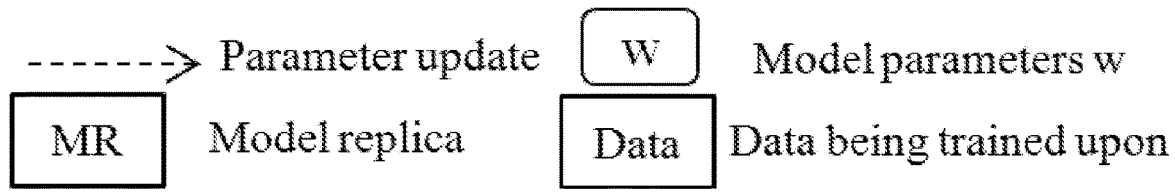
Figure 1:
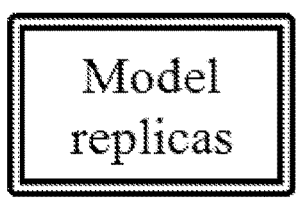
Figure 2:
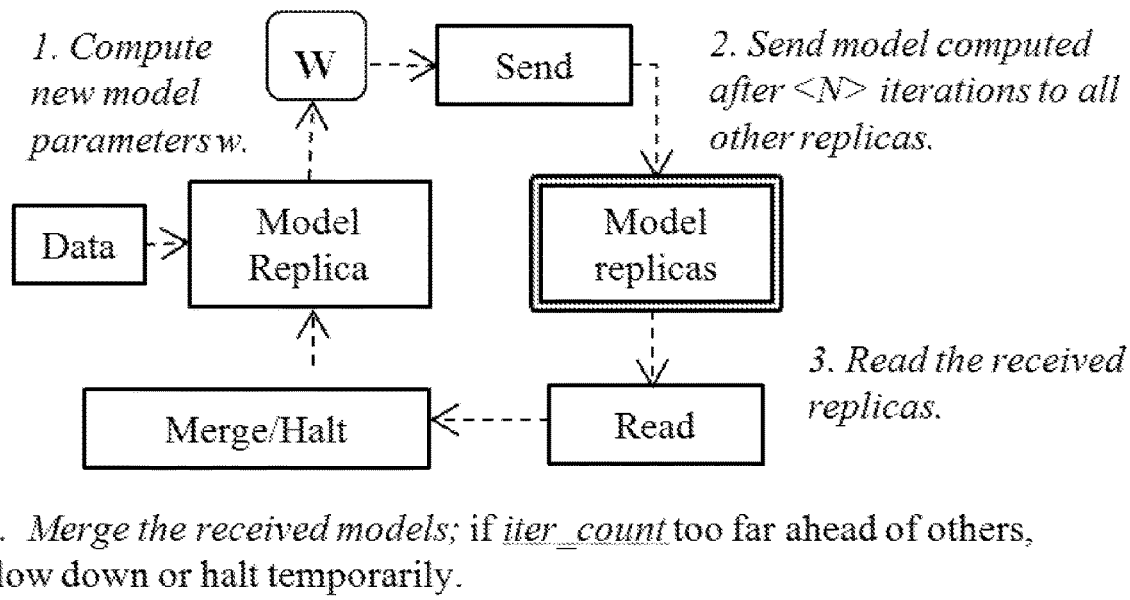
FIG. 2 shows the Bounded Staleness approach.
Figure 3:
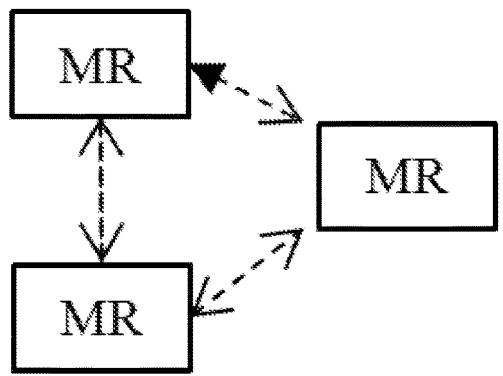
FIG. 3 shows the overall architecture of the system with data and model parameters in MALT.

FIG. 3 shows the overall architecture of the system with data and model parameters in our implementation system MALT. In this system, a plurality of model replicas train in parallel using parameter updates. The model replicas train and compute new model weights. They send/receive parameters from everyone and apply them to their own model.

Figure 4:
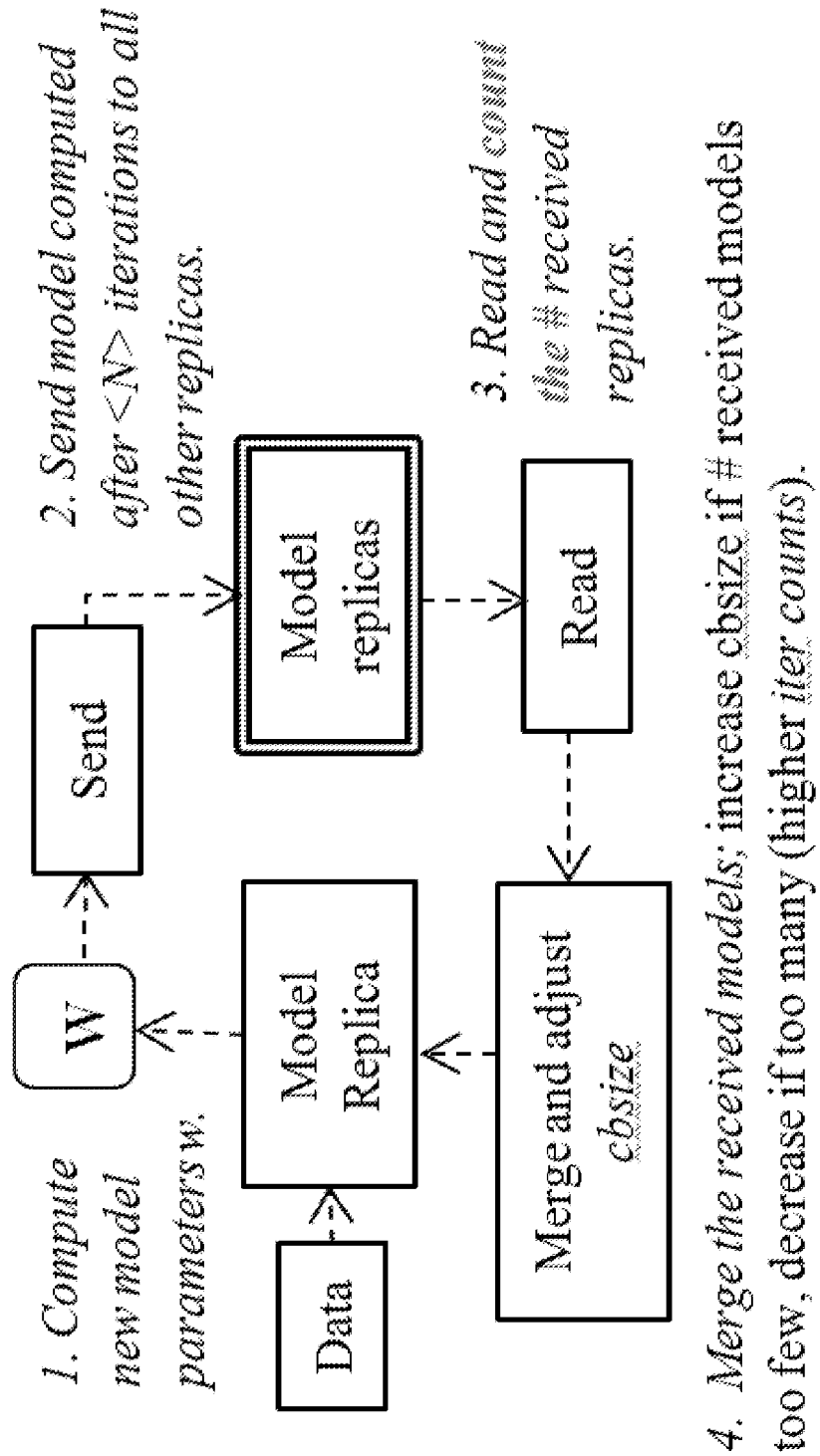
FIG. 4 shows an exemplary system in accordance with the present invention.

FIG. 4 shows an exemplary system which balances communication with computation in addition to training with same speed. In this system, training data is received by each model replica, which computes the new model parameters W (1). The new model is sent after a predetermined N iterations to all other replicas (2). The system then reads and counts the number of receiving replicas (3). Next, the system merges the received models and increases a communication batch size cb_size if the number of received models are below a predetermined threshold, and decreases the cb_size if the number of received models exceed another threshold called iteration counts. cb_size represents a communication batch size with the number of samples trained before the updated model is sent out iter_count represents the iteration count (of data) being processed at each node. The system of FIG. 4 achieves the following:

1) Balancing computation and communication in distributed machine learning.

2) Adjusting the communication batch sizes at runtime (training time) to automatically balance CPU and network.

3) Ensuring accurate convergence and high accuracy ML models by adjusting training sizes with communication batch sizes.

4). Merge the received models, increasing cbsize if a number of received models is too few, and decrease cbsize if a number of received models is comparatively too many (e.g., higher iter counts).

The system can adjust the number of iterations before sending model updates (also called as adjusting the communication batch size). This allows the to balance CPU/network and adjust relative training speeds in parallel model replicas.

The system balances CPU and network time in distributed model training to improve performance. A machine-learning model is a set of weights (or parameters), over features. Applying a new input data to this model, gives a prediction output to a classification or regression problem. Distributed machine learning involves training a machine-learning model in parallel. This consists of a cluster of machines, each one training one or more model replicas in parallel. Each replica trains on a subset of data and incrementally updates the machine-learning model, every iteration (or every few iterations). We refer the number of iterations after which models communicate model update as the communication batch size. The replicas merge the incoming models and continue training. Hence, there is a CPU cost of processing the data and computing the model parameter value and there is a network cost of sending the model parameters across the network. To ensure good performance in distributed settings, the amount of CPU and network should be balanced. If the nodes process too many examples before sending the updates, there is a high CPU cost of computing and applying the updates, while the network remains idle most of the time. If the nodes process very few examples and send updates frequently, the CPU may remain unutilized. Furthermore, in the asynchronous case, different machines may have different processing speeds, and there may be a mismatch on how quickly each node can send examples.

The system tries to balance computation and communication and ensure convergence even when there is a mismatch in processing abilities on different nodes. This is done by sending the iteration counts and counting the model updates that arrive at each replica. If a replica notices too few replicas, it increases the communication batch size in small increments. If a replica, notices all replicas with very high iteration counts as compared to itself, it transmits frequently, to continue providing model updates, as other machines merge their updates.

The distributed training is advantageous in many dimensions: scale, speed, with reduced costs. The distributed systems can handle more data than a single machine can. More disks, more memory, more CPUs, and other resources means that the volume of data is no longer an issue. When data is already distributed, pushing the computation to the data increases scalability. The distributed training is fast as the computation being distributed is inherently compute bound (i.e high CPU usage on all machines), or i/o bound (i.e high disk usage on all machines). In this setting adding more CPUs and more disks naturally help the cause. The system is economical as it can obtain the same level of performance with a cluster of several low-end computers.

Figure 5:
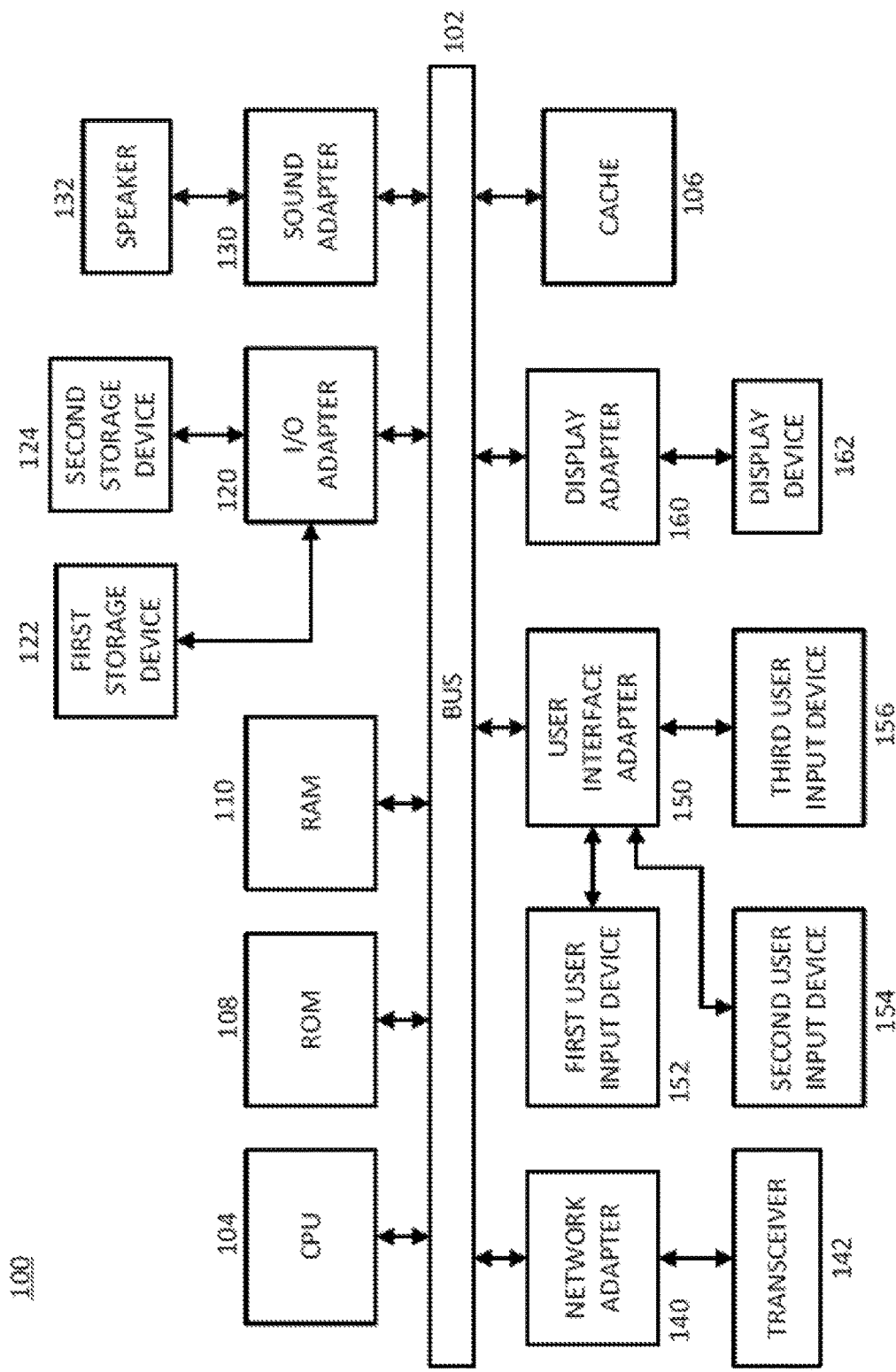
FIG. 5 shows an exemplary processing system to which the present principles may be applied, in accordance with an embodiment of the present principles.

Referring now to the drawings in which like numerals represent the same or similar elements and initially to FIG. 5, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memo (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A machine learning method, comprising:
   installing a plurality of model replicas for training on a plurality of computer learning nodes;
   receiving training data at each model replica and updating parameters for the model replica after training, wherein a number of training iterations is adjusted prior to sending any model updates;
   sending the parameters to other model replicas with a communication batch size;
   evaluating received parameters from other model replicas; and
   dynamically adjusting the communication batch size to balance computation and communication overhead and ensuring convergence even with a mismatch in processing abilities on different computer learning nodes, wherein:
   a new model generated based on the updated parameters is sent to each of the other model replicas after a predetermined number of iterations,
   a total number of receiving replicas are read, counted, and merged, wherein a communication batch size is increased when the total number of received replicas is below a predetermined threshold, and communication batch size is decreased when the total number of received models exceeds an iteration count threshold.

2. The method of claim 1, comprising sending iteration counts and counting the model updates that arrive at each model replica, and if a model replica notices too few replicas, the model replica increases the communication batch size in increments, and if the model replica notices other model replicas have higher iteration counts as compared to its iteration count, the model replica increases model update transmission frequency as other computer learning nodes merge their updates.

3. The method of claim 1, comprising balancing computation and communication in distributed machine learning.

4. The method of claim 1, comprising adjusting the communication batch sizes to automatically balance processor and network loads.

5. The method of claim 1, comprising ensuring accurate convergence and high accuracy machine learning models by adjusting training sizes with communication batch sizes.

6. The method of claim 1, comprising training a plurality of model replicas trained in parallel using parameter updates.

7. The method of claim 1, wherein the model replicas train and compute new model weights.

8. The method of claim 1, comprising sending or receiving parameters from all other model replicas and applying the parameters to the current model replica model.

9. The method of claim 1, comprising training on data captured by sensors coupled to an actuator.

10. The method of claim 9, wherein the actuator comprises a motor or engine to move a physical object.

11. A machine learning system, comprising:
    a plurality of computer learning nodes running a plurality of model replicas for training, each including a processor and a data storage device, the processors being configured for:
    receiving training data at a first model replica and updating parameters for the model replica after training, wherein a number of training iterations is adjusted prior to sending any model updates;
    sending the parameters to other model replicas with a communication batch size;
    evaluating received parameters from other model replicas; and
    adjusting the communication batch size to balance computation and communication overhead and ensuring convergence even with a mismatch in processing abilities on different computer learning nodes, wherein:
    a new model generated based on the updated parameters is sent to each of the other model replicas after a predetermined number of iterations,
    a total number of receiving replicas are read, counted, and merged, wherein a communication batch size is increased when the total number of received replicas is below a predetermined threshold, and communication batch size is decreased when the total number of received models exceeds an iteration count threshold.

12. The system of claim 11, wherein the processor is further configured for sending iteration counts and counting the model updates that arrive at each model replica, and if a model replica notices too few replicas, the model replica increases the communication batch size in increments, and if the model replica notices other model replicas have higher iteration counts as compared to its iteration count, the model replica increases model update transmission frequency as other computer learning nodes merge their updates.

13. The system of claim 11, wherein the processor is further configured for balancing computation and communication in distributed machine learning.

14. The system of claim 11, wherein the processor is further configured for adjusting the communication batch sizes to automatically balance processor and network loads.

15. The system of claim 11, wherein the processor is further configured for ensuring accurate convergence and high accuracy machine learning models by adjusting training sizes with communication batch sizes.

16. The system of claim 11, wherein the processor is further configured for training a plurality of model replicas trained in parallel using parameter updates.

17. The system of claim 11, wherein the model replicas train and compute new model weights.

18. The system of claim 11, comprising sending or receiving parameters from all other model replicas and applying the parameters to the current model replica model.

* * * * *